United States Patent
Medo et al.

(10) Patent No.: US 9,149,052 B2
(45) Date of Patent: Oct. 6, 2015

(54) METHODS OF OBTAINING STERILE MILK AND COMPOSITIONS THEREOF

(75) Inventors: Elena M. Medo, Murrieta, CA (US); Armando Montoya, San Gabriel, CA (US); Martin Lee, Studio City, CA (US); David Rechtman, Hermosa Beach, CA (US)

(73) Assignee: PROLACTA BIOSCIENCE, INC., City of Industry, CA (US)

( * ) Notice: Subject to any disclaimer, the term of this patent is extended or adjusted under 35 U.S.C. 154(b) by 1934 days.

(21) Appl. No.: 12/438,789

(22) PCT Filed: Aug. 30, 2007

(86) PCT No.: PCT/US2007/019234
§ 371 (c)(1),
(2), (4) Date: Jul. 12, 2011

(87) PCT Pub. No.: WO2008/027572
PCT Pub. Date: Mar. 6, 2008

(65) Prior Publication Data
US 2011/0256269 A1    Oct. 20, 2011

Related U.S. Application Data

(60) Provisional application No. 60/841,371, filed on Aug. 30, 2006, provisional application No. 60/867,748, filed on Nov. 29, 2006.

(51) Int. Cl.
| | | |
|---|---|---|
| A23C 9/00 | (2006.01) | |
| A23C 9/20 | (2006.01) | |
| A23C 3/02 | (2006.01) | |
| A23C 9/142 | (2006.01) | |
| A23L 1/302 | (2006.01) | |
| A23L 1/303 | (2006.01) | |
| A23L 1/304 | (2006.01) | |

(52) U.S. Cl.
CPC . *A23C 9/206* (2013.01); *A23C 3/02* (2013.01); *A23C 9/1422* (2013.01); *A23C 2210/252* (2013.01)

(58) Field of Classification Search
CPC .. A23C 2210/252; A23C 3/02; A23C 9/1422; A23C 9/206; A23C 9/142; A23C 2210/256; A23C 2210/254; A23C 2210/208; A23C 2210/206; A23L 1/296
USPC ................ 426/72, 73, 74, 231, 581, 491, 580
See application file for complete search history.

(56) References Cited

U.S. PATENT DOCUMENTS

| | | | | |
|---|---|---|---|---|
| 2,148,100 | A * | 2/1939 | Browne | 426/423 |
| 4,462,932 | A * | 7/1984 | Lonergan | 530/361 |
| 2002/0012732 | A1 * | 1/2002 | Lindquist | 426/522 |
| 2003/0152942 | A1 * | 8/2003 | Fors et al. | 435/6 |
| 2005/0100634 | A1 * | 5/2005 | Medo | 426/34 |

OTHER PUBLICATIONS

Dan Wilson of Best Syndication was downloaded from the internet at http://www.bestsyndication.com/2005.Dan-WILSON/Health/08/080705-breast-mil.htm.*

* cited by examiner

*Primary Examiner* — D. Lawrence Tarazano
*Assistant Examiner* — Jerry W Anderson
(74) *Attorney, Agent, or Firm* — Cooley LLP (57) ABSTRACT

The disclosure provides a simple and effective methods for sterilization of milk without degradation or loss of biologically active agents in the milk and the products produced by such methods.

13 Claims, 1 Drawing Sheet

METHODS OF OBTAINING STERILE MILK AND COMPOSITIONS THEREOF

CROSS REFERENCE TO RELATED APPLICATIONS

This application is a U.S. National Phase of International Application No. PCT/US07/19234, filed Aug. 30, 2007 which claims priority to U.S. Provisional Application Ser. No. 60/841,371, filed Aug. 30, 2006, and U.S. Provisional Application No. 60/867,748, filed Nov. 29, 2006, the disclosures of which are incorporated herein by reference.

TECHNICAL FIELD

The invention is directed to methods of sterilization of whole milk while retaining a substantial amount of beneficial biological agents and reducing bioburden. The disclosure also includes milk products obtained by the methods of the disclosure.

BACKGROUND

Human breast milk is a valuable therapy in the treatment of preterm, critically ill and other immune compromised neonates and children. Yet, for these critically ill patients, processed human donor milk poses a measure of risk, notably, from *B. cereus*, a ubiquitous food toxin found in about 4% of human milk samples. *B. cereus* is most troubling because of its ability to form a spore that cannot be killed thru standard pasteurization. Other bacteria of concern include *Clostridium perfringens, Cryptosporidium parvum, Cyclospora cayatenesis, Escherichia coli, listeria monocytogenes, Salmonella,* and *Staphylococcus aureus.*

To further complicate things, some donors give several "clean" LOTS (free of *B. cereus* and other pathogens) and then a lot will be contaminated. When the milk of qualified donors is pooled, milk infected with *B. cereus* or other pathogens ends up contaminating other clean lots, resulting in the destruction of the entire pool. There are limits for the number of colony forming units of these bacteria and although those limits are seldom reached, any pool that exceeds those limits is discarded and cannot be used for processing. Although testing the raw milk prior to pooling is helpful, the concentration of proteins done to make certain products effectively concentrates everything in the milk, including these pathogens. While other pathogens can be eliminated with pasteurization, *B. cereus* pathogen cannot be eliminated with pasteurization, therefore, it is vital that the pooled product be certified free of *B. cereus* prior to pasteurization and filling. Further, it is desirable to provide pools of raw milk that are substantially free of pathogens prior to pasteurization, to optimize the quality and safety of the product.

SUMMARY

The disclosure provides a method for obtaining a human milk composition comprising: filtering whole milk through at filter of about 100-400 microns; heat treating the whole milk at about 58-65° C. for about 20-40 minutes; separating whole milk into a skim portion and a fat portion; filtering the skim portion through one or more skim filters to obtain a permeate portion and a protein rich skim portion (i.e., retentate); heating the fat portion to a temperature of about 90-120° C. for about one hour sufficient to reduce the bioburden of the fat portion; and mixing a fraction of the processed fat portion with the protein rich skim portion to obtain a human milk composition. In one aspect, the whole milk comprises pooled human milk. In another aspect, the method further comprises testing a sample of the whole milk for the presence of HIV, HBV, HCV or any combination thereof prior to filtration. In a further aspect, the filtering of whole milk is performed through a filter-screen of about 200 microns. The heat treating of the whole milk can be performed at about 63° C. for about 30 minutes. In another aspect, the skim portion following separation comprises about 0.69% fat, about 1.07% protein, and about 7.14% lactose and the fat portion following separation comprises about 46% fat, about 2% protein, and about 10% lactose. In some aspects, the fat portion is further processed to obtain additional skim and the additional skim is pooled with the skim portion. The method can further comprise adjusting the skim portion with a cream portion prior to filtration of the skim portion to obtain a fat concentration in the skim portion of about 55% to about 65% of the protein content of the skim portion. In another aspect, the protein rich skim portion comprises about 8% protein. The method can further comprise washing the one or more skim filters with permeate to obtain a protein wash and adding the protein wash to the protein rich skim portion. The whole milk can be human milk. The method can further include pasteurizing the milk product resulting from the method.

The disclosure also provides a human milk composition obtained from the methods of the disclosure. In one aspect, the human milk composition comprises a protein constituent of about 20-70 mg/ml; a fat constituent of about 35-85 mg/ml, a carbohydrate constituent of about 70-115 mg/ml; and wherein the composition optionally comprises human IgA.

The disclosure provides a human milk composition comprising a donor autologous raw milk and an allogeneic milk composition, wherein the human milk composition comprises at least about 2.1 g/dL human milk protein. In one aspect, the human milk protein is not derived from a lyophilized protein sample (e.g., the human protein is a non-lyophilized human protein). In another aspect, the composition comprises about 2.1 g/dL to about 4.0 g/dL human milk protein. In one aspect, the final mixed human milk composition comprises about 2.2 to about 4% human protein.

The disclosure also provides a kit comprising the human milk composition of the disclosure and a graduated bottle for mixing the human milk composition with raw human milk to obtain a mixed formulation wherein the mixed formulation comprises about 4 cal/ounce more than the raw milk without the human milk composition of the disclosure.

The disclosure further provides a method of obtaining a nutritional milk composition comprising: measuring the nutritional content of a raw human milk; adding a human milk composition of the disclosure to the raw milk to increase the nutritional value of the raw milk about 4 calories/ounce.

The disclosure provides a method of providing supplemental nutrients to preterm infants comprising adding the human milk composition of the disclosure to raw human milk and administering a mixed human milk to a premature infant.

The details of one or more embodiments of the disclosure are set forth in the accompanying drawings and the description below. Other features, objects, and advantages will be apparent from the description and drawings, and from the claims.

DETAILED DESCRIPTION

As used herein and in the appended claims, the singular forms "a," "and," and "the" include plural referents unless the context clearly dictates otherwise. Thus, for example, reference to "a sample" includes a plurality of such samples and reference to "the protein" includes reference to one or more proteins known to those skilled in the art, and so forth.

Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein.

The publications discussed above and throughout the text are provided solely for their disclosure prior to the filing date of the present application. Nothing herein is to be construed as an admission that the inventors are not entitled to antedate such disclosure by virtue of prior disclosure.

Human milk has long been recognized as the ideal food for preterm and term infants because of its nutritional composition and immunologic benefits. Human milk is the most desirable source of such nutritional and immunological benefits. However, nutritional value of donor milk varies and there is concern about bacterial, viral and other contamination of donor milk. For infants, but particularly for premature infants, the ideal nutritional situation comprises the birth mother's milk. Alternatively, or additionally, the mother may express milk using a breast pump and store it for later use. Although there are few contraindications for breastfeeding, some contraindications include infants having galactosemia, and where mothers have active tuberculosis, are HTLV I or II positive, are being administered radioisotopes, antimetabolites, or chemotherapy, or are subjects of drug abuse. With respect to HIV infection, the situation is more complicated and the balance of risk to benefit has to be professionally evaluated.

Despite the well-documented positive effects of breastfeeding, the present in-hospital initiation rate in the United States is only 64 percent and the duration rate, at 6 months postpartum, is about 29 percent. Alternatives to breastfeeding are the use of human donor milk, formula as supplementary feeding to human milk, and formula alone. Fortification of expressed milk is indicated for many very low birth weight infants.

The Academy of Pediatrics Policy Statement suggests that banked human milk may be a suitable feeding alternative for infants whose mothers are unable or unwilling (e.g., for social reasons) to provide their own milk. The Human Milk Banking Association of North America (HMBANA), established in 1985, has published national guidelines for the establishment and operation of a donor human milk bank. These guidelines are analogous to those used to protect the supply in human blood banking.

Preterm infants are commonly fed either a commercial infant formula designed specifically for these infants or their own mother's milk. Research is still underway regarding the nutritional requirements of these infants. However, numerous studies have documented that unsupplemented preterm milk and banked term milk provide inadequate quantities of several nutrients to meet the needs of these infants (Davies, D. P., "Adequacy of expressed breast milk for early growth of preterm infants". ARCHIVES OF DISEASE IN CHILDHOOD, 52, p. 296-301, 1997). Estimated energy requirements of growing low birth weight infants are approximately 120 Cal/kg/day; exact energy needs vary because of differences in activity, basal energy expenditure, the efficiency of nutrient absorption, illness and the ability to utilize energy for tissue synthesis. About 50% of the energy intake is expended for basal metabolic needs, activity and maintenance of body temperature. About 12.5% is used to synthesize new tissue, and 25% is stored. The remaining 12.5% is excreted. Preterm human milk is often lacking in particular nutritional aspect. For example, preterm human milk often lacks calcium, phosphorus and protein. Thus, it has been recommended that when preterm infants are fed preterm human milk, the human milk be fortified to better meet the nutritional needs of the preterm infant.

Similac Natural Care® and Enfamil® Human Milk Fortifier are commercially available human milk fortifiers. The fortifiers differ with respect to their form, source of ingredients and energy and nutrient composition. In addition, these products are artificial in nature. There is need in the neonatal intensive care unit (NICU) for both liquid and powdered human milk fortifiers. Ideally, the best fortifier is of a human original. There is not a currently available human derived milk fortifier.

The secretion of fluid from the female mammary gland includes a number of constituents referred to hereinafter simply as milk. Expressed milk is not typically sterile and contains bacteria even when obtained under aseptic conditions. Milk, however, is very quickly contaminated by microorganisms from the environment (air, expression devices, contact with hands or other non-sterile objects, a milk tank or receptacle, and the like) and specific pathogens such as *B. cereus* propagate rapidly even in pasteurized milk.

Due to its composition of carbohydrates, proteins, fats, minerals and vitamins, milk is an ideal culture medium for virtually all microorganisms, milk spoils within a short time. Refrigerating the milk retards bacterial growth slightly and extends its keeping qualities by a few days.

In addition to the bacteria that sour milk, such as *lactobacilli*, human pathogenic bacteria especially constitute a great problem. These include various pathogenic strains of *salmonella*, *campylobacter*, *listeria* and *staphylococci*, which can occur especially in nonpasteurized milk, or also *clostridia* or *bacillus* species, which due to their heat-resistant spores can survive pasteurization at 62-74° C.

Typically milk is sterilized by what is called UHT treatment, i.e., a heat treatment at 120° C. to 145° C. for a few seconds. In addition to a "boiled taste" the extreme heating results in the loss of biological activity through, for example, heat denaturation of proteins. Such proteins include valuable immunologically active components present in the milk including, for example, immunoglobulins and other immunity stimulating substances, as well as other important proteins, such as lactoferrin, lactoperoxidase, growth factors, and the like. For example, biologically active colostral milk has been shown to be useful for gastrointestinal disorders, among other things.

Furthermore, toxins can be released from bacteria by heat activation. For example, endotoxins of gram-negative bacteria are not destroyed by pasteurization. In UHT sterilization, the killing of gram-negative bacteria can increase the endotoxins by a factor of 6 to 7 (Motter, J., Neth. Milk Dairy Journal, Vol. 41, 137-145, 1987).

Current methods of treating whole milk results in the reduction of beneficial biologically active proteins and other molecules. For example, lypholization, high heat treatment and the like reduce by, for example, degradation and denaturation biologically active proteins, lipids, and other agents. In addition, where reduced heating is used in pasteurization, the result provides milk products with increased bioburden and therefore increased consumer risk. Certain filtration steps used currently reduce protein content and are used to filter-out lactose and salts.

The disclosure provides a human milk fortifier for premature infants who require additional nutrients to support their growth. The disclosure comprises a human milk derived fortifier obtained by the methods of the disclosure. In some aspects, the human milk fortifier/human milk derived supplement products can be added to human milk, whereby it supplements the levels of protein, fat, vitamins and minerals. The disclosure further provides a method for providing supplemental nutritional value to a premature infant who requires additional nutrients for growth.

The terms "premature", "preterm" and "low-birth-weight (LBW)" infants are used interchangeably and refer to infants born less than 37 weeks gestational age and/or with birth weights less than 2500 gm. The needs of the premature infant are particularly acute. For very low-birth-weight infants (<1500 g), mortality before the age of 1 year is 25%. For low-birth-weight babies (<2500 g), the 1-year mortality is 2 percent; still considerably higher than the figure of 0.25 percent for normal-birth-weight infants (>2500 g).

Of particular concern is necrotizing enterocolitis (NEC), a serious gastrointestinal disease of unknown etiology in neonates. NEC is characterized by mucosal or transmucosal necrosis of part of the intestine. The very small, ill infant, who is born before term, is most susceptible to NEC. Incidence of NEC increasing due, in part, because of the improved survival rate of high-risk group premature infants.

In one aspect, the disclosure provides methods for obtaining and processing human milk from a donor or collection of donors. The methods of the disclosure including processes that reduce bioburden while maintaining nutritional value in a fortified preparation. Generally the methods include measures to identify and qualify suitable donors. Donors are typically recommended as a donor by their personal physician. Amongst other reasons, this helps to ensure that donors are not chronically ill. Methods and systems for qualifying and monitoring milk collection and distribution are described in U.S. patent application Ser. No. 11/526,127 (which is incorporated herein by reference in its entirety).

A screening process by interview as well as biological sample processing is performed. A biological sample is screened for viral (e.g., HIV 1 and 2, HTLV I and II, HBV, and HCV) and syphilis, as well as other prokaryotic pathogens (e.g., *B. cereus*) and donations testing positive are discarded.

Any potential sample found positive on screening removes the sample from processing and the donor from further donations. Yet another measure taken comprises testing a donor sample or pool of milk for drugs of abuse.

Donors may be periodically requalified. For example, a donor may be required to undergo screening by the same protocol as used in their initial qualification every four months. A donor who does not requalify or fails qualification is deferred until such time as they do properly requalify. In some instances the donor is permanently deferred if warranted by the results of requalification screening. In the event of the latter situation, all remaining milk provided by that donor is removed from inventory and destroyed.

A qualified donor may donate at a designated facility (e.g., a milk bank office) or, typically, expresses milk at home. In one aspect, the qualified donor is provided with supplies by a milk bank or directly from a milk processor (the milk bank and processor may be the same or different entities) to take home. The supplies will typically comprise a computer readable code (e.g., a barcode-label) on containers and may further include a breast pump. The donor can then pump and freeze the milk at home, preferably at a temperature of −20° C. In one aspect, the donor milk is accepted provided that the blood test results are satisfactory 10-14 days after the last visit to the donor milk center; if such results are satisfactory, an appointment is made for the donor to drop off the milk at the center or have it collected from home. The milk and container are examined for their condition and the barcode information checked against the database. If satisfactory, the units are placed in the donor milk center or processing center freezer (−20° C.) until ready for further testing and processing.

In another aspect, the milk is expressed by the donor at her home and not collected at the milk banking facility the process of the disclosure involves the sampling of each donor's milk for markers to guarantee that the milk is truly from the registered donor. Such subject identification techniques are known in the art (see, e.g., International Application Serial No. PCT/US2006/36827, which is incorporated herein by reference). The milk may be stored (e.g., at −20° C.) and quarantined until the test results are received. Throughout the above process, any non-complying milk specimens are discarded. As is the case with blood donation centers, access to all confidential information about the donor, including blood test data, is tightly controlled.

Collected, approved (e.g., passed risk factor testing), milk is processed by either or a combination of sterile filtration and/or pasteurization (or other method of reducing bioburden). In one aspect, the milk is process by filtration through a large micron filter or screen (e.g., about 100-400 microns), typically about 200 microns. The whole filtered milk is heat treated (100; see FIG. 1) in preparation for separation the whole milk is heated the filtered milk for about 30 minutes (e.g., about 20-60 minutes) at about 63° C. (e.g., about 50-80° C.). In one aspect, the process raises the whole milk temperature, prior to filtration, in excess of 70° C. for an acceptable amount of time (HTST). For example, the contents of milk containers designated for a particular production lot are thawed at 65° C. and pooled into an insulated process tank. The tank incorporates a continuous temperature monitoring device and a jacket containing circulating ethylene glycol coolant. The glycol is chilled to 2 to 8° C. for the pooling process and the tank mixer is agitated without vortexing or foaming the milk which might damage important protein constituents. A sample of the pooled milk can be analyzed for bioburden.

In yet another aspect, the whole milk formulation in the process tank is connected to the high-temperature, short-time (HTST) pasteurizer via platinum-cured silastic tubing. After pasteurization, the milk is collected into a second process tank and cooled. Other methods of pasteurization can be used (e.g., vat pasteurization), such techniques are known in the art. For example, in vat pasteurization the milk in the tank is heated to a minimum of 62.5 degrees Celsius and held at that temperature for about thirty minutes. The air above the milk is steam heated to five degrees Celsius above the milk temperature. In another aspect, both HTST and vat pasteurization are performed.

Figure 1:
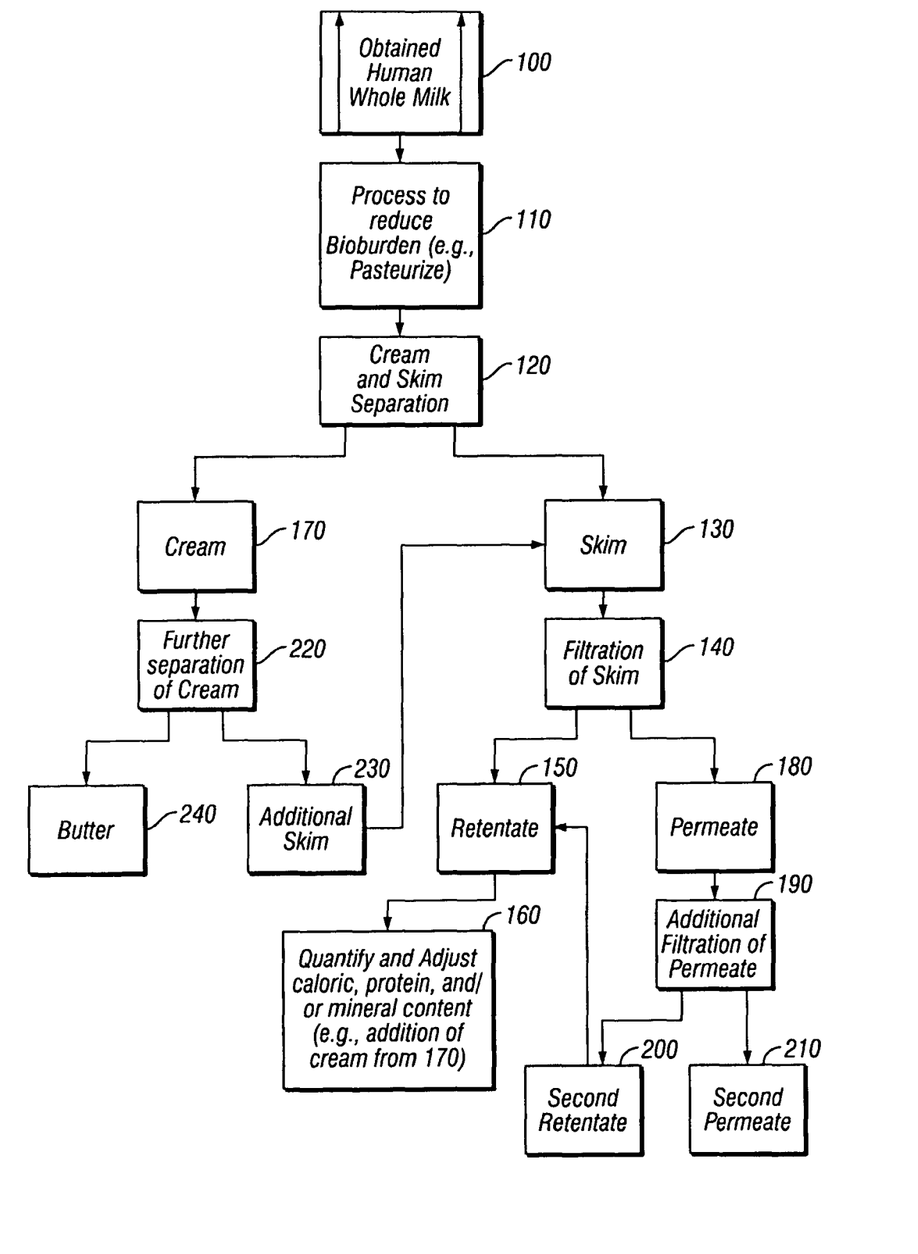
FIG. 1 shows a process of the disclosure.

In yet another aspect (as depicted in FIG. 1), the whole human milk 100 is heated 110 as described herein. The heated whole milk is then separated into skim and cream (i.e., fat) 120. The milk is defatted to skimmed milk by conventional methods, such as centrifugation. In one aspect, the separation of fat and skim does not include removal of divalent ions (e.g., calcium and the like). In one aspect, the pooled milk is pumped into a centrifuge to separate the fat (cream) from the rest of the milk while the skim milk is transferred into a second process tank where it remains at 2 to 8° C. until an optional filtration step. After centrifugation, the cream flows into a small stainless steel container. In one aspect, the cream is then pasteurized followed by quantification of caloric, protein and fat content. In another aspect, after separation is completed, the volume, protein, and fat content of the cream is determined and a portion of the cream added back to the skim milk to achieve the caloric, protein and fat content to assist in filtration or for the specific product being made. Minerals can be added to the milk prior to or after pasteurization and/or filtration.

The skim portion 130 is filtered 140 to increase the concentration of biological factors in the retentate 150 (e.g., protein enriched skim portion). The caloric content of the enriched skim is then determined and adjusted 160, if needed, by addition of cream 170, obtained previously. In one aspect, the permeate 180 obtained from a first pass filtration is collected and re-filtered 190 to obtain a second retentate 200 comprising additional biological factors that may have passed through to the permeate 180 during a first filtration 140 and a second permeate 210. This second retentate 200 can be added to the first retentate 150 to increase biological agent concentration (e.g. protein concentration). The cream 170 from a first separation 120 can be further process 220 to obtain additional skim 230. For example, cream 170 may be further separated 220 to obtain butter 240 and skim 230. The additional skim 230 can be added to skim portion 130.

By "whole milk" is meant milk from which no fat has been removed. By "skim" or "skim milk" is meant whole milk less all or part of the fat content. It therefore may be appreciated that "skim milk" includes such variants as "low fat milk" wherein less than substantially all of the fat content has been removed. By "cream" or "fat portion" is meant the portion of whole milk separated from the skim milk. Typically the cream comprises long chain, medium chain and short chain fatty acids at a concentration higher than that of skim milk obtained from the same preparation.

According to one embodiment, an ultrafiltration membrane used to filter skim milk is sized to prevent the passage of any substance with a molecular weight greater than 40 kDa. Such excluded substances include, but are not limited to: milk protein and milk fat. Alternately, ultrafiltration membranes which prevent the passage of any substance with a molecular weight greater than 1-40 kDa and any range therein may also be used. Typically filters comprising 0.45 µm or smaller (e.g., 0.2 µm) can be used. Typically a 0.2 µm filter will be used. In some embodiments graded filtration can be used (e.g., a first filtration at 0.45 µm and a second at 0.3 µm and a third at 0.2 µm, or any combination thereof). The separation of fat from the skim results in ease of filtration. The sterilization can be performed by known methods, such as filtration or tangential filtration, using appropriate depth filters or membrane filters.

The following milk proteins can be trapped by the ultrafiltration membrane (molecular weights are noted in parenthesis): lactalbumin (~14 kDa); casein (~23 kDa); lactoglobulin (~37 kDa); albumin (~65 kDa); and immunoglobulins (>100 kDa).

Ultrafiltration membranes having a 3.5 kDa or less molecular weight cut-off are available, for example, from Advanced Membrane Technology, San Diego, Calif. and Dow Denmark, Naskov, Denmark, respectively. Ultrafiltration membranes made of ceramic materials may also be used. Ceramic filters have an advantage over synthetic filters. Ceramic filters can be sterilized with live steam.

A pressure gradient is typically applied across the ultrafiltration membrane to facilitate filtration. Typically, the pressure gradient is adjusted to maintain a desired filter flux through the membrane. In one aspect, the ultrafilter membrane is first primed with a small amount of milk and the permeate discarded, prior to beginning filtration. Priming of the filter in this manner is believed to be advantageous to filtering efficiency.

Following pasteurization, the milk product is processed aseptically. After cooling to about 2 to about 8° C., the pasteurized milk can be tested for nutritional content, protein content, specific factors and adjusted to a desired level. In one aspect, the enriched skim/retentate is measured for nutritional content, protein content, specific factors and adjusted to a desired level by, for example, adding back pasteurized cream to obtain a desired caloric content. The product is pumped from the process tank into a filling unit for dispensing into syringes or bottles. The final product is tested for viral and bacterial contamination prior to packaging and distribution.

The methods and compositions of the disclosure maintain desirable activities of important proteins and vitamins while reducing bioburden. Various organisms are tested for their presence at various stages of the processing of the milk to the final product. Organisms used in the validation studies to determine contamination include the bacteria: E. coli, S. aureus, and S. agalactiae, and the viruses: human immunodeficiency virus (HIV), hepatitis A virus (HAV), bovine viral diarrhea virus (BVDV) and pseudorabies virus (PSR), the latter of which is used as a marker for CMV. HIV and HAV are known to be potential contaminants of human milk and were, therefore, selected as relevant viruses. Hepatitis C virus (HCV) is also known to be a potential contaminant of human milk. Using the methods of the disclosure the following were obtained:

TABLE 1

Log$_{10}$ Reduction Values for Test Organisms

| Pathogen | Log$_{10}$ Reduction (HTST) | Log$_{10}$ Reduction (vat) |
|---|---|---|
| E. coli | >32 | Not done |
| S. aureus | ~15 | Not done |
| S. agalactiae | >26 | Not done |
| BVDVa | ~6.1 | ~6.13 |
| HIVb | ~6.7 | ~5.97 |
| PSRc | ~6.8 | ~6.05 |
| HAVd | >2.6, <5.5 | ~2 |

These viral log reduction values do not represent the maximum reduction that can be achieved by the process of the disclosure. Of particular interest is the kill of hepatitis A virus (HAV), a small, non-lipid enveloped, resilient virus which is unaffected by pasteurization conditions (62.5±1.0° C. for 15 minutes) traditionally used in the milk industry. Furthermore, although S. aureus is fairly resistant to heat treatment, this organism showed a ~15 log reduction with the process of the disclosure.

The disclosure also provides a fortifier composition. The fortifier is obtained by performing the collection and filtration and/or pasteurization process described herein. The fortifier of the disclosure comprises important milk proteins and biological factors.

Human milk comprises about 100,000 different biological factors—proteins, lipids, carbohydrates, vitamins, and trace minerals. Key components include the monomeric immunoglobulin A (IgA) and the dimeric secretory IgA (s[IgA]$_2$), lysozyme, and lactoferrin. Accordingly, the pasteurization process, while helping to ensure the safety of the milk product, should ideally also preserve adequate quantities of those essential components which are potentially heat labile.

Immunoglobulin A (IgA) and secretory IgA (s[IgA$_2$]) were quantitated in human milk samples using sandwich ELISA procedures. Following pasteurization using the Prolacta HTST process, IgA concentration declined about 27% (e.g., from about 7% to about 47%), on average, and secretory IgA levels declined 17% (e.g., from about 7% to about 27%), on average, compared to the corresponding values in untreated human milk samples.

Lysozyme activity was determined by a microtiter assay using a *Micrococcus lysodeikticus* suspension as a substrate. The lysozyme activity in human milk after pasteurization was about 22,000 IU/mL, 57% (e.g., from about 47% to about 67% or more) of the initial activity (39,000 IU/mL) in raw human milk.

Lactoferrin concentration was determined by an ELISA technique. The lactoferrin content of human milk after pasteurization using the methods of the disclosure was about 0.033 g/100 mL, about 14% (e.g., from about 4-24%) of the initial concentration (0.24 g/100 mL) in raw human milk.

Vitamin analyses were performed by validated HPLC procedures. Vitamin A, vitamin C, and $\alpha$-, $\gamma$-, and $\delta$-tocopherol levels remained unchanged following pasteurization. The vitamin B6 content of human milk slightly decreased to about 7.8 µg/100 mL, about 89% of the initial concentration of 8.8 µg/100 mL. These results are presented in Table 2.

TABLE 2

Effect of Pasteurization on Human Milk Constituents

| Constituent | Untreated Milk | Pasteurized Milk | % Remaining |
|---|---|---|---|
| Immunoglobulin A (mg/mL) | 315 | 230 | 73 |
| Secretory IgA (mg/mL) | 462 | 379 | 82 |
| Lysozyme (IU/mL) | 39,000 | 22,000 | 57 |
| Lactoferrin (g/100 mL) | 0.24 | 0.033 | 14 |
| Vitamin B6 (µg/100 mL) | 8.8 | 7.8 | 89 |

The protein constituent of the milk compositions and fortifiers of the disclosure provide a source of protein. Protein is needed for growth, synthesis of enzymes and hormones, and replacement of protein lost from the skin and in urine and feces. These metabolic processes determine the need for both the total amount of protein in a feeding and the relative amounts of specific amino acids. The adequacy of the amount and type of protein in a feeding for infants is determined by measuring growth, nitrogen absorption and retention, plasma amino acids, certain blood analytes and metabolic responses. A particular advantage of the disclosure is the presence of human IgA proteins, lysozyme, and lactoferrin in the compositions.

Although not necessary it will be recognized that the human milk compositions of the disclosure can be modified or supplemented with non-naturally occurring or heterologous/heterogeneous constituents. For example, the protein content can be adjusted or modified using nitrogen source suitable for human consumption. Such proteins are well known by those skilled in the art and can be readily selected when preparing such composition. Examples of suitable protein constituents that can be added include casein, whey, condensed skim milk, nonfat milk, soy, pea, rice, corn, hydrolyzed protein, free amino acids, protein sources which contain calcium in a colloidal suspension with the protein and mixtures thereof.

Another constituent of the milk compositions of the disclosure comprise a source of fat. Fat is generally a source of energy for LBW infants, not only because of its high caloric density but also because of its low osmotic activity in solution. Again, although not necessary, the milk compositions of the disclosure can be supplemented with fat constituents. Such heterologous/heterogeneous fat constituents include high oleic safflower oil, soy oil, fractionated coconut oil (medium chain triglycerides, MCT oil), high oleic sunflower oil, corn oil, canola oil, coconut, palm and palm kernel oils, marine oil, cottonseed oil and specific fatty acids such as docosahexaenoic acid (DHA) and arachidonic acid.

Docosahexaenoic acid is an omega-3 fatty acid. DHA is the most abundant 20 carbon omega-3 PUFA in human milk. However, human milk DHA content will vary greatly depending on the diet of the mother. If the mother eats fish high in DHA often, her milk will contain higher DHA levels, while a mom with less access to fish will have lower DHA levels in her milk. Consequently, human milk may require DHA supplementation to insure that the preterm infant is receiving sufficient amounts of DHA. DHA supplementation is typically accompanied by arachidonic acid supplementation. U.S. Pat. No. 5,492,938 to Kyle et al. describes a method of obtaining DHA from dinoflagellates and its use in pharmaceutical composition and dietary supplements.

Carbohydrates are another constituent of the compositions of the disclosure. Carbohydrates provide a readily available source of energy that assists in growth and that reduces the risk of tissue catabolism that results in malnourished rapidly developing infants. In human milk and most standard milk-based infant formulas, the major carbohydrate is lactose. LBW infants may be unable to fully digest lactose because lactase activity in the fetal intestine is not fully developed until late in gestation (36 to 40 weeks). On the other hand, sucrase activity is maximal by 32 weeks' gestation, and glucosoamylase activity, which digests corn syrup solids (glucose polymers), increase twice as rapidly as lactase activity during the third trimester. The human milk compositions of the disclosure can be supplemented with carbohydrates. Examples of carbohydrates that can be used to supplement the human milk compositions of the disclosure include, but are not limited to, hydrolyzed corn starch, maltodextrin, glucose polymers, sucrose, corn syrup, corn syrup solids, rice syrup, glucose, fructose, lactose, high fructose corn syrup and indigestible oligosaccharides such as fructooligosaccharides (FOS).

Vitamins and minerals are important to proper nutrition and development of an infant. A premature infant or LBW infant requires electrolytes such as sodium, potassium and chloride for growth and for acid-base balance. Sufficient intakes of these electrolytes are also needed for replacement of losses in the urine and stool and from the skin. Calcium, phosphorus and magnesium are needed for proper bone mineralization. For bones to grow, adequate amounts of these minerals must be present in a feeding.

Trace minerals are associated with cell division, immune function and growth. Consequently, provision of sufficient amounts of trace minerals are needed for infant growth and development. Trace minerals that are important include copper, magnesium and iron (which is important for the synthesis of hemoglobin, myoglobin and iron-containing enzymes). Zinc is needed for growth, for the activity of numerous enzymes, and for DNA, RNA and protein synthesis. Copper is necessary for the activity of several important enzymes. Manganese is needed for the development of bone and cartilage and is important in the synthesis of polysaccharides and glyoproteins. Accordingly, the human milk and fortifier compositions of the disclosure can be supplemented with vitamins and minerals.

Vitamin A is a fat-soluble vitamin essential for growth, cell differentiation, vision and the immune system. Vitamin D is important for absorption of calcium and to a lesser extent, phosphorus, and for the development of bone. Vitamin E (tocopherol) prevents peroxidation of polyunsaturated fatty acids in the cell, thus preventing tissue damage. Folic acid is important in amino acid and nucleotide metabolism. Serum folate concentrations have been shown to fall below normal after 2 weeks of age in LBW infants with low folic acid intakes. Additionally, several B vitamins are present at low concentrations in preterm milk.

As described above, the variability of human milk vitamin and mineral concentrations and the increased needs of the preterm infant requires a minimal fortification to insure that a developing infant is receiving adequate amounts of vitamins and minerals. Examples of supplemental vitamins and minerals in the human milk composition and fortifier of the disclosure include vitamin A, vitamin B1, vitamin B2, vitamin B6, vitamin B12, vitamin C, vitamin D, vitamin E, vitamin K, biotin, folic acid, pantothenic acid, niacin, m-inositol, calcium, phosphorus, magnesium, zinc, manganese, copper, sodium, potassium, chloride, iron and selenium. The additional nutrients chromium, molybdenum, iodine, taurine, carnitine and choline may also require supplementation.

Provided are compositions comprising a 67 Kcal/dL (20 calorie per ounce) whole milk product, an 80 Kcal/dL (24 calorie per ounce) whole milk product, and a human milk fortifier. The milk fortifier compositions comprises from about 20-70 mg/ml of protein, about 35-85 mg/ml of fat, about 70-115 mg/ml of carbohydrates and contains human IgA. Various caloric compositions can be obtained using the methods of the disclosure. Exemplary compositions are a 24 calorie milk composition and a fortifier milk composition.

The 24 calorie whole milk composition comprises the following constituents: human milk, calcium glycerophosphate, potassium citrate, calcium gluconate, calcium carbonate, magnesium phosphate, sodium chloride, sodium citrate, zinc sulfate, cupric sulfate, and manganese sulfate. The 24 calorie composition has the following characteristics per unit serving (10 ml) (Note the values are approximations and as will be recognized in the art will vary by method of testing, machine used and the like):

| Calories | 8.5 |
|---|---|
| Total Fat | 0.44 g |
| Sodium | 2.3 mg |
| Potassium | 6.3 mg |
| Total Carbs. | 0.79 g |
| Sugars | 0.64 g |
| Protein | 0.31 g |
| Vitamin A | 21.1 IU |
| Vitamin C | <0.10 mg |
| Calcium | 8.0 mg |
| Iron | 13.3 mcg |
| Phosphorus | 3.8 mg |
| Magnesium | 0.74 mg |
| Chlorine | 5.0 mg |
| Zinc | 0.12 mcg |
| Copper | 17.3 mcg |
| Manganese | <6.2 mcg |
| Osmolarity | ~322 mOsm/Kg $H_2O$ |

The fortifier composition comprises the following constituents: human milk, calcium carbonate, potassium phosphate, calcium phosphate, calcium glycerophosphate, calcium gluconate, sodium citrate, magnesium chloride, calcium chloride, magnesium phosphate, zinc sulphate, cupric sulfate, and manganese sulfate. The fortifier composition has the following characteristics per unit serving (2 ml) (Note the values are approximations and as will be recognized in the art will vary by method of testing, machine used and the like):

| Calories | 2.7 |
|---|---|
| Total Fat | 0.15 g |
| Sodium | 1.2 mg |
| Potassium | 2.3 mg |
| Total Carbs. | 0.21 g |
| Sugars | 0.15 g |
| Protein | 0.10 g |
| Vitamin A | 5.5 IU |
| Vitamin C | <0.02 mg |
| Calcium | 8.9 mg |
| Iron | 0.01 mg |
| Phosphorus | 3.6 mg |
| Magnesium | 0.38 mg |
| Chlorine | 0.4 mg |
| Zinc | 0.05 mg |
| Copper | 2.7 mcg |
| Manganese | <1.3 mcg |
| Osmolarity | ~343 mOsm/Kg $H_2O$ (when mixed with raw milk) |

The osmolarity of the human milk compositions and the fortifier of the disclosure are important to adsorption, absorption and digestion of the compositions. Improper osmolarity can result in abdominal distention and vomiting by the infant. The osmolarity of the human milk composition and fortifier (once mixed with raw milk) of the disclosure is typically less than about 400 mOsm/Kg $H_2O$. Typically the osmolarity is from about 310 mOsm/Kg of water to about 380 mOsm/Kg of water. Where a composition of the disclosure is supplemented with a carbohydrate or fat constituent, the osmolarity of the compositions should be adjusted. For example, the type of constituent (e.g., carbohydrate or fat) impacts the osmolarity of the fortified human milk. The more hydrolyzed the carbohydrate the higher the osmotic activity. Additionally, partially hydrolyzed carbohydrate sources may further increase the osmolarity when reconstituted with human milk due to further hydrolysis by human milk amylase. One skilled in the art can readily select the carbohydrate or combination of carbohydrates that will result in the desired osmolarity of the reconstituted fortifier/human milk composition.

The fortifier is typically mixed with human milk to add 4 cal/ounce. Typically this is an 80:20 mixture of raw milk: fortifier (e.g., 8 ml of raw milk and 2 ml of fortifier), indicated as "Plus 4" in the table below. Other typical mixtures include 70:30 ("Plus 6"); 60:40 ("Plus 8"); and 50:50 ("Plus 10"), although any and all relative proportions or amounts of raw milk to fortifier are contemplated by the present invention. Table 3 sets forth examples of mixture of raw human milk (e.g., a mother's own milk) combined with human milk compositions of the disclosure. Table 4 shows exemplary caloric calculations for a mixture of raw human milk and a milk composition of the disclosure.

TABLE 3

| | Mom's Protein (grams) | | Percentage Mom's milk | Protein from Mom | | Protein from Fortifier | 100 ml Total Protein | | | 120 k-cal | | | |
|---|---|---|---|---|---|---|---|---|---|---|---|---|---|
| | | | | | | | | | | Volume | Total Protein | | Protein percentage | |
| | Low | High | | Low | High | | Low | High | Percentage | mL | Low | High | Low | High |
| Mom's Milk | 1.4 | 1.8 | 100% | 1.4 | 1.8 | 0.0 | 1.4 | 1.8 | | 177.5 | 2.5 | 3.2 | | |
| Plus 4 | 1.4 | 1.8 | 80% | 1.1 | 1.4 | 1.1 | 2.2 | 2.5 | 2.54% | 147.9 | 3.3 | 3.8 | 2.22% | 2.54% |
| Plus 6 | 1.4 | 1.8 | 70% | 1.0 | 1.3 | 1.7 | 2.6 | 2.9 | 2.91% | 136.5 | 3.6 | 4.0 | 2.63% | 2.91% |

TABLE 3-continued

| | Mom's Protein (grams) | | Percentage Mom's milk | Protein from Mom | | Protein from Fortifier | 100 ml Total Protein | | | 120 k-cal Volume mL | Total Protein | | Protein percentage | |
|---|---|---|---|---|---|---|---|---|---|---|---|---|---|---|
| | Low | High | | Low | High | | Low | High | Percentage | | Low | High | Low | High |
| Plus 8 | 1.4 | 1.8 | 60% | 0.8 | 1.1 | 2.2 | 3.0 | 3.3 | 3.28% | 126.8 | 3.9 | 4.2 | 3.04% | 3.28% |
| Plus 10 | 1.4 | 1.8 | 50% | 0.7 | 0.9 | 2.8 | 3.5 | 3.7 | 3.65% | 118.3 | 4.1 | 4.3 | 3.45% | 3.65% |

TABLE 4

| | Mom's milk | | | | | |
|---|---|---|---|---|---|---|
| | Low | High | Plus 4 | Plus 6 | Plus 8 | Plus 10 |
| Cal/oz | 17 | 22 | 24 | 26 | 28 | 30 |
| ml/oz | 29.58 | 29.58 | 29.58 | 29.58 | 29.58 | 29.58 |
| Cal/ml | 0.57 | 0.74 | 0.81 | 0.88 | 0.95 | 1.01 |
| ml required 120 Cal | 209 | 161 | 148 | 137 | 127 | 118 |
| Grams of protein per ml | 0.014 | 0.018 | 0.024 | 0.028 | 0.032 | 0.036 |
| Protein/120 Cal | 2.9 | 2.9 | 3.5 | 3.8 | 4.0 | 4.2 |

Cal/oz is assumed to be 20 for purposes of cal/ml purposes
Protein in Mom's milk is assumed to be 1.6 ml/dl The fortifier typically comes in 10 ml syringes or 20 ml bottles. A bottle may be included with the syringes. In either case of the syringe kit (e.g., syringe and bottle) or the 20 ml bottles, the bottles can comprise graduated markers to assist in proper dilution. For example, a mother's raw milk can be tested to determine the raw milk's nutritional value. Typical raw milk comprises, on average, 1.1% protein, 4.2% fat, 7.0% lactose (a sugar), and supplies 72 kcal of energy per 100 grams. A mother's raw milk may be tested for nutritional value and then adjusted using a fortifier composition of the disclosure to add 4 cal/ounce to the mother's raw milk.

"A unit dose" refers to individual packages of fortifier containing an amount of fortifier that will be used in a preparation of milk for the infant. The amount of fortified human milk prepared for a premature infant typically ranges from 25 ml to 150 ml a day. Consequently, a single unit dose is the appropriate amount of fortifier to fortify an 8 to 40 ml preparation of raw milk. Additional unit dosages can be added for larger volumes. Thus, a unit dose is 2 ml fortifier per 8 ml of raw milk or 10 ml of fortifier per 40 ml of raw milk. In one aspect, the unit dose comprises a 10 ml syringe and may comprise 2 ml graduated markings sufficient to prepare multiple milk preparations.

Typically, the amount of human milk prepared is based on the amount of milk needed to provide an infant with a 24-hour nutritional supply. For example, a 1500 gm infant would be fed 150 ml of milk a day. If frozen milk is used, the frozen milk is placed in a warm water bath until completely thawed. Special attention is given to mixing in the fortifiers. Gentle mixing is required to avoid breaking the milk fat globule, which can increase the adherence of the milk fat to the sides of feeding containers and result in significant loss of fat (energy). The prescribed amount of fortified milk is drawn up into syringes and labeled with identification. When milk preparation is complete, the labeled, aliquoted feedings are delivered to the nurseries and placed into refrigerators for easy access by the nursing staff. Typically, the refrigerated fortified milk is warmed prior to feeding. For example, the fortified milk is warmed in a dry heat laboratory incubator set within a range of about 35-45° C. for about 15 minutes. This brings the temperature of the fortified milk to room temperature. The fortified milk may be administered to the infant as a bolus feeding or through a syringe infusion pump for continuous feeding. If an infusion pump is used, the syringe tip is positioned upright to allow for a continuous infusion of fat and the syringe is attached directly to the feeding tube to decrease the potential surface area that the fat and immunologic components may adhere to.

The disclosure provides a human milk and fortifier composition that is not xenogeneic and provides human proteins that have been demonstrated to promote immunological development and infant growth. Further, the human milk and fortifier compositions of the disclosure are well tolerated and maximizes the health benefits of human milk while addressing the variability of human milk as a source of energy, protein, calcium, phosphorus, sodium and other micronutrients.

Individual unit dose size packages are typically used over bulk packaging. Because of the small volumes of milk administered to premature infants over the course of a days feeding, small volumes of fortified human milk are prepared. Sterility in a bulk container that has been repeatedly opened, aliquoted, and stored is always a concern in a hospital environment. Individual unit doses allow for addition of small amounts of fortifier to human milk without the possibility of contamination of the remaining fortifier.

Numerous types of containers are readily available and known to one practicing the art. Examples of container types useful in the methods and compositions of the disclosure include bottles, syringes and cans (e.g., metal, glass or plastic).

As stated above, the instant disclosure also relates to a method of providing nutrition to preterm infants by adding the fortifier of the disclosure to human milk to adjust raw human milk to a desired nutritional content and administering the fortified human milk to a premature infant. The disclosure further provides a method of promoting growth of a premature infant by administering a fortified human milk to a premature infant.

Milk obtained from humans or bovines can be processed using the methods of the disclosure. In one aspect, the milk comprises a colostral milk. Typically the colostral milk will be diluted as appropriate in sterile water (e.g., 1:1 with water).

The milk obtained by the process of the disclosure is substantially identical to the raw milk comprising, however, a reduce amount of bioburden or no pathogens such as *B. cerus*. The resulting sterile milk product comprises biological activities (e.g., comprising protein and antibody compositions) yet free of bacteria, fungi and spores found in raw milk.

The skim milk portion obtained is free of bacteria, fungi and spores. The filtered skim is then stored separately or recombined with the fat portion following filtration. Where the skim is stored separately it can later be recombined with a fat portion prior to consumption. Alternatively, the skim portion can be consumed. The skim and/or recombined milk can be stored for long periods of time preferably at below room temperature and more preferably at 4° C.

The following examples are meant to further illustrate, but not limited the disclosure.

EXAMPLES

Processing is done in a Class 100,000 clean room and filling is done in a Class 10,000 clean room. Donor milk is pooled and a sample taken for risk factor determination (e.g., PCR is carried out for HIV, HBV, HCV contamination and infection). The donor milk is filtered through a 200 micron screen to remove clumps and large particular matter.

The filtered whole milk is then heat treated for 30 minutes at about 63° C. or treated at about 73° C. for 16 seconds (e.g., HTST). This heat treatment is to reduce bioburden as well as to prepare the milk for separation. The filtered, heated milk is separated into skim and fat (cream). An analysis of the skim and cream after separation comprises: (a) skim—about 0.69% Fat, about 1.07% Protein, about 7.14% Lactose; and (b) cream—about 46% Fat, about 2% Protein, about 10% Lactose.

About 50% of the cream is removed and run through the separator a second time. This process produces more skim milk, which will increase protein yield. The product that comes out the non-skim side of the separator is butter, which can retained and used for other processes.

A cream or fat portion is added to the skim to adjust the content of the skim for better ultra filtration. For example, the fat in the skim needs to be about 55% to about 65% of the protein content. One purpose of the ultrafiltration step is to remove excess water and concentrate the protein. The filter used to in the ultrafiltration has about a 40 kDa cutoff. The water is referred to as permeate. An analysis of the collected skim, following ultrafiltration, is about 8% protein. A filter or post wash can be performed using permeate to recover any protein that was trapped on the filters during the ultra filtration process. The post wash is added to the concentrated skim milk to provide a protein content of about 7.2%

Cream is added to the concentrated skim milk, after post wash is added, to increase calories to the correct target. At this point, the product has about 9.2% fat, about 6.3% protein, and about 10.5% lactose. A sample of the Final Bulk is sent for mineral analysis. This is to measure the minerals in the bulk. The Final Bulk is frozen at −20 C or colder. When the mineral results are returned from the lab, the Final Bulk is thawed. Based on the starting minerals content of the Final Bulk, the amount of any additional minerals to be added, if any, is calculated The final targets is about: (a) Calcium—471.6 mg/dL; Phosphorus—225.2 mg/dL; Sodium—75 mg/dL; Potassium—208.1 mg/dL; Magnesium—24.4 mg/dL; Chloride—69.1 mg/dL; Zinc—3.1 mg/dL; Copper—0.1 mg/dL; and Manganese—9.2 micrograms/dL for low caloric content bulk products (e.g. Prolact™+4, also known as Plus 4, or Prolact™+6, also known as Plus 6); (b) Calcium—235.8 mg/dL; Phosphorus—112.6 mg/dL; Sodium—37.5 mg/dL; Potassium—104 mg/dL; Magnesium—12.2 mg/dL; Chloride—34.6 mg/dL; Zinc—1.6 mg/dL; Copper—0.05 mg/dL; and Manganese—4.6 micrograms/dL for Prolact™+8, also known as Plus 8, and Prolact™+10, also known as Plus 10. The Final Bulk is heated to 50° C. and the minerals are mixed into the Final Bulk.

After the minerals have been mixed, the product is pasteurized in a tank. The tank is jacketed and hot glycol is used to heat up the tank (the product temperature is about 67° C., the air temperature above the product is about 70° C.) and the product is pasteurized for 30 minutes. The product temperature is brought down to about 5° C. using cold glycol in the jacketed tank. The product can then be aliquoted into fillable containers as needed. For example, fill sizes include: Prolact™+4 10 mL; Prolact™+4 20 mL; Prolact™+6 15 mL; Prolact™+6 30 mL; Prolact™+8 20 mL; Prolact™+8 40 mL; Prolact™+10 25 mL; and Prolact™+10 50 mL. When the fill is done, bottles can be taken at random for testing for nutritional value and bioburden. The following pathogens can be tested for Total Aerobic Count—<10 Colony Forming Unit/mL; *Bacillus cereus*—1 Colony Forming Unit/mL; *E. coli*—1 Colony Forming Unit/mL; Coliform—1 Colony Forming Unit/mL; *Pseudomonas*—1 Colony Forming Unit/mL; *Salmonella*—1 Colony Forming Unit/mL; *Staphylococcus*—1 Colony Forming Unit/mL; Yeast—1 Colony Forming Unit/mL; Mold—1 Colony Forming Unit/mL. Product generated by the methods above can include the following content: For (a) Prolact +4 and Prolact +6 (i) Total Calories are about 1.35 Cal/mL to about 1.55 Cal/mL; (ii) Protein is about 5.5 g/dL to about 6.5 g/dL; (iii) Fat is about 8.5 g/dL to about 9.5 g/dL; (iv) Calcium is about 417.6 mg/dL; (v) Chloride is about 69.1 mg/dL; (vi) Copper is about 0.1 mg/dL (vii) Magnesium is about 24.4 mg/dL; (vii) Manganese is about 9.2 micrograms/dL; (ix) Phosphorus is about 225.2 mg/dL; (x) Potassium is about 208.1 mg/dL; (xi) Sodium is about 75 mg/dL; and (xii) Zinc is about 3.1 mg/dL; (b) Prolact +8 and Prolact +10 (i) Total Calories are about 1.35 Cal/mL to about 1.55 Cal/mL; (ii) Protein is about 5.5 g/dL to about 6.5 g/dL; (iii) Fat is about 8.5 g/dL to about 9.5 g/dL; (iv) Calcium is about 208.8 mg/dL; (v) Chloride—about 34.6 mg/dL; (vi) Copper is about 0.05 mg/dL; (vii) Magnesium is about 12.2 mg/dL; (viii) Manganese is about 4.6 micrograms/dL; (ix) Phosphorus is about 112.6 mg/dL; (x) Potassium is about 104.1 mg/dL; (xi) Sodium is about 37.5 mg/dL; and (xii) Zinc is about 1.6 mg/dL.

The embodiments of the disclosure may, of course, be carried out in other ways than those set forth herein without departing from the spirit and scope of the disclosure. The embodiments are, therefore, to be considered in all respects as illustrative and not restrictive and that all changes and equivalents also come within the description of the disclosure.

We claim:

1. A method for obtaining a human milk composition comprising:
   (a) filtering whole milk through at filter of about 100-400 microns;
   (b) heat treating the whole milk at about 58-65° C. for about 20-40 minutes;
   (c) separating the whole milk into a skim portion and a fat portion;
   (d) adding a fat portion to the skim portion to adjust the fat in the skim;
   (e) ultrafiltering the skim portion through one or more skim filters to obtain a permeate portion and a protein rich skim portion; and
   (f) mixing a fraction of the processed fat portion with the protein rich skim portion to obtain a human milk composition.

2. The method of claim 1, wherein the whole milk comprises pooled human milk.

3. The method of claim 1, further comprising testing a sample of the whole milk for the presence of human immunodeficiency virus (HIV), hepatitis B virus (HBV), hepatitis C virus (HCV) or any combination thereof prior to filtration.

4. The method of claim 1, wherein the filtering of whole milk is performed through a filter-screen of about 200 microns.

5. The method of claim 1, wherein the heat treating of the whole milk is at about 63° C. for about 30 minutes.

6. The method of claim 1, wherein the skim portion following separation comprises about 0.69% fat, about 1.07% protein, and about 7.14% lactose.

7. The method of claim 1, wherein the fat portion following separation comprises about 46% fat, about 2% protein, and about 10% lactose.

8. The method of claim 1 or 7, wherein the fat portion is further processed to obtain additional skim.

9. The method of claim 8, wherein the additional skim is pooled with the skim portion.

10. The method of claim 1, wherein a fat portion is added to the skim portion in step (d) in an amount sufficient to obtain a fat concentration in the skim portion of about 55% to about 65% of the protein content of the skim portion.

11. The method of claim 1, wherein the protein rich skim portion comprises about 8% protein.

12. The method of claim 1 or 11 further comprising washing the one or more skim filters with permeate to obtain a protein wash and adding the protein wash to the protein rich skim portion.

13. The method of claim 1, wherein the human milk composition is pasteurized.

\* \* \* \* \*